Sept. 4, 1923.  M. J. WALSH  1,467,212
RAKE
Filed Oct. 15, 1921
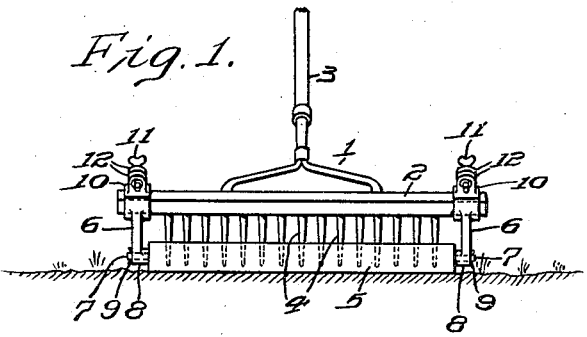
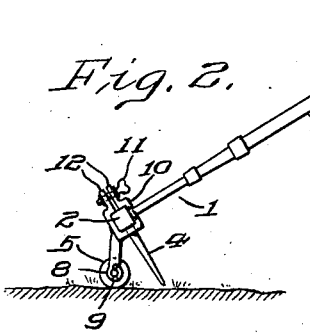
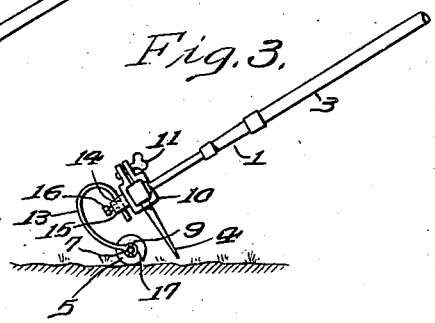
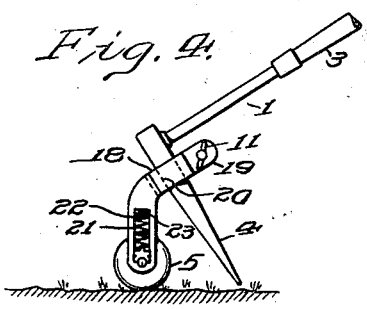
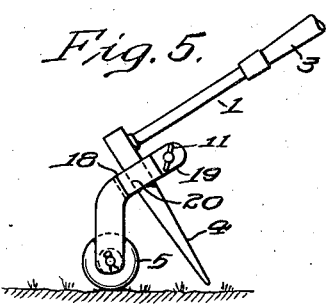
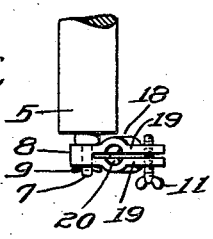
INVENTOR
Michael J. Walsh.
WITNESS Patented Sept. 4, 1923.

1,467,212

UNITED STATES PATENT OFFICE.

MICHAEL J. WALSH, OF LANGHORNE, PENNSYLVANIA.

RAKE.

Application filed October 15, 1921. Serial No. 507,986.

*To all whom it may concern:*

Be it known that I, MICHAEL J. WALSH, a citizen of the United States, and a resident of Langhorne, county of Bucks, State of Pennsylvania, have invented certain new and useful Improvements in Rakes, of which the following is a specification, reference being had to the accompanying drawing.

My invention relates to rakes adapted for lawn, garden or field use, a principal object being to provide said rakes with rotatable supporting means which enable the rake to be more easily operated and by which the penetrating depth of the rake teeth may be regulated thereby preventing excessive penetration into the lawn or soil and consequent tearing of the grass and undesirable removal or displacement of the soil.

A further object of my invention is to make said rotating means so as to be readily removable from and replaceable upon the rake. A still further object of my invention is to make said rotating means adjustably mountable upon the rake. A still further object of my invention is to provide a resilient support for said rotating means functioning as a shock absorber when the rake is being operated over uneven surfaces.

The invention further includes all of the other various objects and novel features of construction and arrangement hereinafter more definitely specified and described.

In the accompanying drawing, Fig. 1 is a perspective view illustrating one embodiment of my invention; Fig. 2 is a side elevation of my improvement as shown in Fig. 1; Figs. 3, 4 and 5 are side elevations of other embodiments of my invention, and Fig. 6 is a top plan view of the clamping device shown in Figs. 4 and 5. Like numerals refer to like parts in the several figures.

The rake 1 is of a usual type having a head 2, handle 3 and teeth 4. A roller 5 which may be of wood, metal, rubber or any other suitable material is carried by the supports 6, the spindles 7 of the roller being mounted in bearings 8 of the supports 6 and held therein by cotter pins 9. The supports 6 may be made of iron, steel or any suitable material and, in the embodiments shown in Figs. 1, 2 and 3, are formed with clamping means 10 adapted to fit snugly over the end of the rake head 2 and to be clamped thereto by the tightening of the set screw 11 passing through the flanges 12 forming a part of the clamp 10, it being understood that in forming the clamp 10 suitable clearance between the flanges 12 is provided to enable the clamp to be tightened about the rake head 2. The length of the supports 6 may be varied as desired. As an example of the utility of my invention, it frequently happens, in raking a lawn, that the teeth of the rake owing to uneven surface, will dig into the lawn too deeply and tear away the grass. By my improvement this undesirable result is avoided and I have also found that less energy is required with corresponding increased ease of operation in the use of my improved rake over that of rakes heretofore used for like purposes.

In the embodiment shown in Fig. 3 I provide a spring 13 of considerable stiffness, the upper end of which is securely held in a suitable slot 14 within a boss 15 on the clamp 10 by a set screw 16; upon the lower end of the spring is provided a bearing 17 within which is mounted the spindle 7 of the roller 5, being held therein by the cotter pin 9. The springs 13 one at either end of the rake, will provide desired resiliency when the rake is being operated over rough or uneven ground, contributing to ease of operation and efficiency.

In Figs. 4 and 5 I have shown two other embodiments of my invention in which the roller is carried by supports which are mounted upon rake teeth at the ends of the rake by the clamp 18 having clamping members 19 with suitable clearance therebetween and provided with an opening 20 into which the rake tooth fits. A set screw 11 passes through the clamping members 19 and is adapted to draw the said clamping members together so as to fit snugly about the rake tooth. The roller 5 is carried, in the embodiment shown in Fig. 5, by the clamping supports in the same manner as it is carried in the embodiment shown in Fig. 1 and which I have heretofore described. In Fig. 4 I have introduced resilient means in the support for the roller in the form of a spiral spring 21 fixedly positioned within a suitable slot 22 in the depending portion of the support by pintles 23. As will be seen in Figs. 4 and 5, the clamps may be adjusted longitudinally of the rake teeth thereby regulating the penetrating depth of the rake teeth; this desirable adjustability to meet varying conditions of soil or accomplish different results is also present in the embodiment shown in Fig. 3 in which the spring is adjustable within the slot 14.

It will also be noted that the roller passing over the raked surface may act as a leveler and coact with the rake teeth to make a useful and desirable implement for various purposes.

It will be understood that many variations and changes in the details of construction, arrangement and location of parts would readily suggest themselves to persons skilled in the art and fall within the spirit and scope of my invention. I do not desire, therefore, to be limited or restricted to the exact details of construction and arrangement shown and described.

Having thus described my invention, I claim and desire to protect by Letters Patent of the United States:

1. The combination with a rake of the class described, of a roller extending substantially across the head of the rake and adapted to bear the weight of the rake and to limit the penetrating depth of the rake teeth, supports for the ends of said roller, clamps for mounting said supports upon the rake adjacent the ends of the rake head.

2. A rake comprising a handle rigidly secured to the rake head, teeth carried by said rake head, a pair of brackets each mounted on an end of said rake head and providing at their lower ends bearings, a roller mounted in said bearings relatively close to the rear side of said rake teeth and adjacent the ends of said teeth, and yielding connections between the ends of said roller and said brackets whereby said roller may yield vertically to any unevenness in the surface over which it is drawn.

In witness whereof, I have hereunto set my hand this 14th day of October, A. D. 1921.

MICHAEL J. WALSH.